(12) United States Patent
Dobusch et al.

(10) Patent No.: US 8,836,339 B2
(45) Date of Patent: Sep. 16, 2014

(54) SWITCHING DEVICE

(75) Inventors: Gerhard Dobusch, Vienna (AT); Roman Kolm, Schweiggers (AT)

(73) Assignee: Eaton GmbH, Schrems (AT)

( * ) Notice: Subject to any disclaimer, the term of this patent is extended or adjusted under 35 U.S.C. 154(b) by 252 days.

(21) Appl. No.: 13/212,664

(22) Filed: Aug. 18, 2011

(65) Prior Publication Data

US 2012/0212231 A1    Aug. 23, 2012

Related U.S. Application Data

(60) Provisional application No. 61/375,179, filed on Aug. 19, 2010.

(30) Foreign Application Priority Data

Aug. 19, 2010   (AT) .................. A 1391/2010

(51) Int. Cl.
*G01R 31/327* (2006.01)
*H01H 71/74* (2006.01)
*H02H 3/04* (2006.01)
*H01H 83/04* (2006.01)
*H02H 3/33* (2006.01)
*H02H 3/05* (2006.01)
*H02H 3/093* (2006.01)

(52) U.S. Cl.
CPC .............. *H02H 3/335* (2013.01); *H02H 3/05* (2013.01); *H01H 71/74* (2013.01); *H02H 3/093* (2013.01); *H02H 3/044* (2013.01); *H01H 83/04* (2013.01)
USPC ............... 324/424; 361/42; 207/112; 200/5 A (58) Field of Classification Search
None
See application file for complete search history.

(56) References Cited

U.S. PATENT DOCUMENTS

| 3,665,495 | A | * | 5/1972 | Carter et al. .................. 307/67 |
| 4,016,385 | A | * | 4/1977 | Golioto ........................ 200/573 |
| 5,646,459 | A | * | 7/1997 | Hatate et al. .................. 307/85 |
| 6,825,426 | B2 | | 11/2004 | Muench et al. |
| 7,609,497 | B2 | | 10/2009 | Dobusch et al. |
| 2003/0090271 | A1 | * | 5/2003 | Hurwicz ........................ 324/424 |
| 2008/0013227 | A1 | | 1/2008 | Mernyk et al. |
| 2009/0223934 | A1 | | 9/2009 | Kolm et al. |
| 2009/0260967 | A1 | | 10/2009 | Kolm et al. |
| 2009/0315732 | A1 | | 12/2009 | Dobusch et al. |
| 2010/0308943 | A1 | | 12/2010 | Dobusch |

FOREIGN PATENT DOCUMENTS

| AT | 505 635 A4 | 3/2009 |
| DE | 19 65 425 A1 | 6/1971 |
| DE | 102008006360 | 7/2009 |
| EP | 1562213 A1 * | 8/2005 |
| EP | 2 107 662 A2 | 10/2009 |

* cited by examiner

*Primary Examiner* — Melissa Koval
*Assistant Examiner* — Courtney McDonnough
(74) *Attorney, Agent, or Firm* — Henry M Feiereisen LLC (57) ABSTRACT

In a switching device with at least one first electrical switching device input and at least one first electrical switching device output and at least one second electrical switching device output, wherein in a first operating state of the switching device the first switching device input is electrically connected with the first switching device output, wherein in a second operating state of the switching device the first switching device input is electrically connected with the second switching device output, is proposed to configure the switching device for uninterrupted switchover from the first operating state to the second operating state and/or from the second operating state to the first operating state to allow functional testing of a fault current circuit breaker without interruption.

10 Claims, 3 Drawing Sheets

Fig. 6

SWITCHING DEVICE

CROSS-REFERENCES TO RELATED APPLICATIONS

This application claims the benefit of prior filed U.S. provisional Application No. 61/375,179, filed Aug. 19, 2010, pursuant to 35 U.S.C. 119(e), the content of which is incorporated herein by reference in its entirety as if fully set forth herein.

This application also claims the priority of Austrian Patent Application, Serial No. A 1391/2010, filed Aug. 19, 2010, pursuant to 35 U.S.C. 119(a)-(d), the content of which is incorporated herein by reference in its entirety as if fully set forth herein.

BACKGROUND OF THE INVENTION

The present invention relates to a switching device and to a fault current circuit breaker. The present invention also relates to a method for functional testing of a first fault current circuit breaker without interruption of the power supply to a connected load.

The following discussion of related art is provided to assist the reader in understanding the advantages of the invention, and is not to be construed as an admission that this related art is prior art to this invention.

Fault current circuit breakers have a testing device for testing the functionality of the respective fault current circuit breaker, i.e. triggering, in the event of a fault current. Because the respective fault current circuit breaker is triggered, the downstream partial networks and hence also all connected electrical devices are switched off. This is viewed by most uses of electrical systems as inconvenient, because individual settings are erased in many devices. Moreover, severe problems in many electrical systems may occur when they are switched off, because these electrical systems perform safety-related tasks or control technical processes, so that switching these systems off can lead to problems.

In switching processes where a load current is switched from one fault current circuit breaker to another fault current circuit breaker, a temporary presence of asymmetric potentials on at least one of the two fault current circuit breakers cannot be excluded. Such differences in the potential, however, can act on a fault current circuit breaker like an actually present fault current and thus accidentally trigger the fault current circuit breaker without the presence of a fault current. This may possibly prevent uninterrupted switching from one fault current circuit breaker to another fault current circuit breaker.

It would therefore be desirable and advantageous to obviate prior art shortcomings and to provide an improved switching device which supports functional testing of a fault current circuit breaker without requiring disconnection from the power grid.

SUMMARY OF THE INVENTION

According to one aspect of the present invention, a switching device with two operating states includes at least one first electrical switching device input, at least one first electrical switching device output, and at least one second electrical switching device output. In a first operating state of the switching device the first switching device input is electrically connected with the first switching device output, and in a second operating state of the switching device the first switching device input is electrically connected with the second switching device output. The switching device is constructed for uninterrupted transition from the first operating state to the second operating state or from the second operating state to the first operating state.

Such switching device offers the possibility to connect two fault current circuit breakers in parallel and to switch over a load current for one of the two fault current circuit breakers to the other fault current circuit breaker, without triggering one of the two fault current circuit breakers and consequently causing disconnection of the power grid. In this way, the fault circuit current breakers can be functionally tested without causing the loss of settings at electrical devices or safety risks due to importance of the disconnected devices. A fault current circuit breaker identified as being defective can then be exchanged, without requiring disconnection of the electrical partial network connected downstream of the fault current circuit breaker.

This can prevent accidental triggering of one of the two fault current circuit breakers during an intentional uninterrupted switching operation of a load current from a first fault current circuit breaker to a second fault current circuit breaker. Faulty triggering during the switching process can thus be prevented. Unintentional disconnection from the power grid during functional testing of a fault current circuit breaker can then be prevented.

According to another aspect of the present invention, a fault current circuit breaker includes disconnect contacts, and a trigger current circuit at least indirectly operatively connected with the disconnect contacts for disconnecting the disconnect contacts, wherein the trigger current circuit included a first switching arrangement for extending a trigger time of the trigger current circuit by a predetermined time.

In switching processes where a load current is switched from one fault current circuit breaker to another fault current circuit breaker, a temporary presence of asymmetric potentials on at least one of the two fault current circuit breakers cannot be excluded. Such differences in the potential, however, can act on a fault current circuit breaker like an actually present fault current and thus accidentally trigger the fault current circuit breaker without the presence of a fault current. This may possibly prevent uninterrupted switching from one fault current circuit breaker to another fault current circuit breaker.

According to yet another aspect of the present invention, a method for uninterrupted functional testing of a first fault current circuit breaker includes the steps of routing a load current through the first fault current circuit breaker, connecting an input of a second fault current circuit breaker to the load current in parallel with the first fault current circuit breaker, switching the load current over without interruption from the first fault current circuit breaker to the second fault current circuit breaker, performing a functional test of the first fault current circuit breaker, after a successful functional test of the first fault current circuit breaker switching the first fault current circuit breaker on, connecting an input of the first fault current circuit breaker to the load current in parallel with the second fault current circuit breaker, and switching the load current over without interruption from the second fault current circuit breaker to the first fault current circuit breaker.

A functional test can then be performed on a fault current circuit breaker without disconnection from the power grid. The functional testing can then be also performed on fault current circuit breakers without a loss of settings on electrical devices or without causing safety risks due to disconnection of important devices.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, FIGS. 1 to 6 show each an arrangement of a first fault current circuit breaker 22, a second fault current circuit breaker 23 and a switching device 1 according to the invention, wherein the first fault current circuit breaker 22 and the second fault current circuit breaker 23 are electrically connected in parallel with the switching device 1 by way of a coupling unit.

The present invention relates to a method for uninterrupted functional testing of at least one fault current circuit breaker 22, as well as devices for advantageously performing the method. Preferred embodiments of the respective devices will be described below, wherein the method according to the invention described below is preferably not necessarily tied to the use of the described devices.

The disclosed devices include preferred embodiments of a fault current circuit breaker 22, 23 according to the invention, a special switching device 1 according to the invention, and a coupling device 12 for at least electrically and additionally particularly mechanically connecting two fault current circuit breakers with the switching device.

Figure 1:
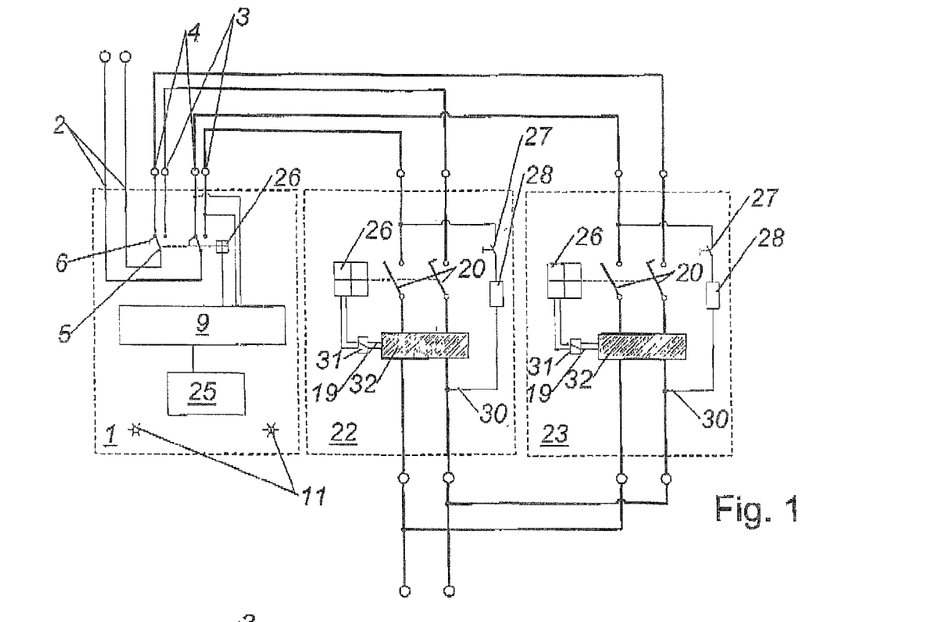
FIG. 1 a schematic circuit diagram of a first preferred embodiment of an arrangement of a switching device according to the invention and two fault current circuit breakers.
Figure 2:
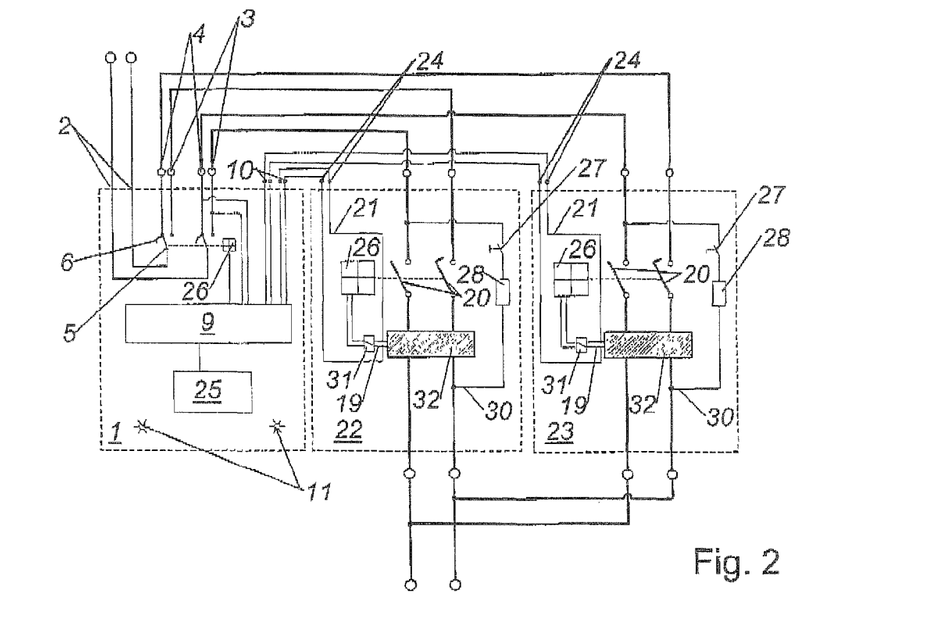
FIG. 2 a schematic circuit diagram of a second preferred embodiment of an arrangement of a switching device according to the invention and two fault current circuit breakers.
Figure 3:
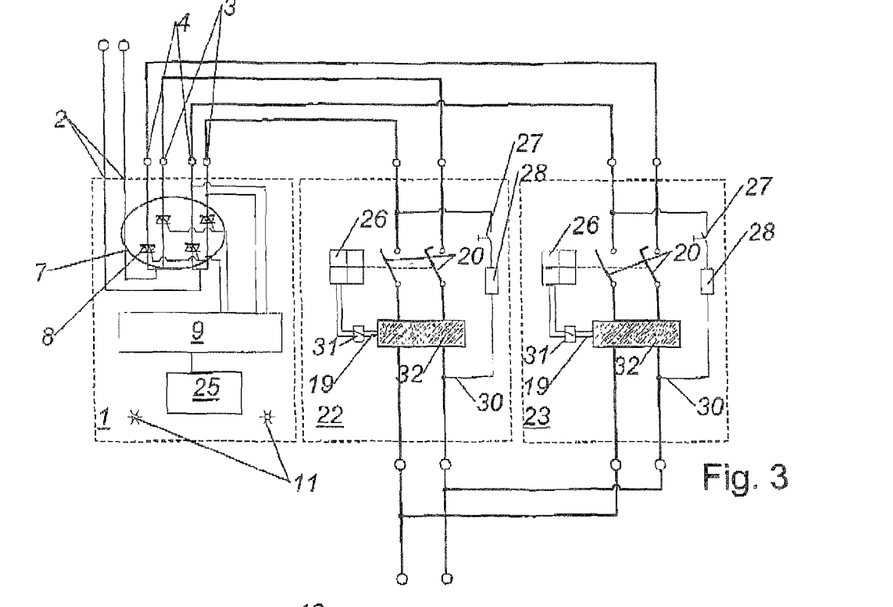
FIG. 3 a schematic circuit diagram of a third preferred embodiment of an arrangement of a switching device according to the invention and two fault current circuit breakers.

FIGS. 1 to 3 each show, inter alia, a schematic circuit diagram of a different preferred embodiment of a switching device 1 with at least one first electrical switching device input 2, and at least one first electrical switching device output 3 and at least one second electrical switching device output 4, wherein in a first operating state of the switching device 1 the first switching device input 2 is electrically connected with the first switching device output 3, wherein in a second operating state of the switching device 1 the first switching device input 2 is electrically connected with the second switching device output 4, wherein the switching device 1 is configured for an uninterrupted transition from the first operating state into the second operating state and/or from the second operating state into the first operating state.

With this type of switching device 1, two fault current circuit breakers 22, 23 can be connected in parallel and a load current can be switched from one of the two fault current circuit breakers 22, 23 to the other fault current circuit breaker 23, 22, without triggering one of the two fault current circuit breakers 22, 23, which would cause disconnection from the power grid. The functional test of fault current circuit breakers 22, 23 can then be performed without a loss of settings on electrical devices or causing safety risks due to an unplanned disconnection of important electrical devices. A fault current circuit breaker 22 identified as being defective can also be interchanged without necessitating disconnection of the electrical partial grid connected downstream of the fault current circuit breaker 22, 23, because the respective other fault current circuit breaker 23 protects during the switchover the downstream connected electrical grid and the connected users.

The term "uninterrupted" preferably indicates a switchover of a load current from one switching device, in the present example from the first fault current circuit breaker 22, to another switching device, in the present example to the second fault current circuit breaker 23, without causing interruptions of the power supplied to downstream components, either due to brief disruptions of the grid during the switching process itself or due to accidental triggering of at least one of the fault current circuit breakers 22, 23.

According to the invention, the switching device 1 can assume a first and a second operating state. Preferably, the switching device 1 has only these two stable operating states, and the transition from one of these operating states to the respective other operating state is implemented as a brief switching process, which itself is not viewed as a stable operating state.

In a modification of the invention, the switching device 1 may further have a third operating state, where the first switching device input 2 is electrically connected with the first switching device output 3 and with a second switching device output 4, and the transitions from the first or second operating state to the third operating state and from the third operating state to the first or second operating state are also implemented to be uninterrupted. This approach not only allows a load current to be switched uninterruptedly from a first fault current circuit breaker 22 to a second fault current circuit breaker 23 and vice versa, but also enables a stable parallel operation of the to fault current circuit breakers 22, 23.

The switching device 1 has, as mentioned above, at least one first electrical switching device input 2 and at least one first electrical switching device output 3 and at least one second electrical switching device output 4. The terms input and output should be interpreted so that the terms which are used in the singular preferably include all functionally required connections of an input and output 2, 3, 4. In the illustrated preferred embodiments, the first switching device input 2 has two terminals, and the first end second switching device outputs 3, 4 likewise have two terminals. Preferably, a switching device output 2 has the same number of terminals as each of the switching device outputs 3, 4, commensurate with the number of conductors, such as the phases and the neutral conductor, of the electrical grid to be protected or to be switched.

The switching device 1 has preferably at least one switch 5, 7 which is electrically connected with the first control device input 2, the first control device output 3 and the second control device output 4, wherein in a first switch position of the switch 5, 7 the first control device input 2 is electrically connected with the first control device output 3, and wherein in a second switch position of the switch 5, 7 the first control device input 3 is electrically connected with the second control device output 4. The respective switch 5, 7 is hereby constructed so that the transition from the first switch position into the second switch position is made without interruption. The switch 5, 7 may only have the two aforedescribed stable switching states. In addition—if the switching device 1 is designed with the aforedescribed third operating state—a corresponding third switch position, for example in form of a center position of the switch 5, 7, can be implemented.

According to the embodiments illustrated in FIGS. 1 and 2, the switching device 1 preferably has at least one mechanical switch 5 with at least partially overlapping switching contacts 6. This is indicated in the corresponding Figures by the symbolic diagram of the mechanical switch 5. A switching device 1 which is unaffected by electrical disturbances and which can be easily maintained even under severe conditions can be implemented with such mechanical switch 5.

Preferably, the contacts also mechanical switch 5 are connected to and guided by a switch shaft. Moreover, the mechanical switch can preferably be connected with a switch lock. The switching process of the respective mechanical switch 5 can then be predefined and force-actuated.

According to the embodiment illustrated in FIG. 3, the switching device 1 preferably includes an electronic switch 7. In this way, a switching device 1 can be constructed which is substantially unaffected by mechanical vibrations and allows fast switching processes.

As illustrated in FIG. 3, the respective electronic switch 7 is preferably formed as a switching arrangement having a predetermined number of triacs 8. Triac 8 is here an abbreviation for "triode alternating current switch." However, the switching arrangement may include any type of switch, such as semiconductors, whereby the switching element may be implemented particularly in form of a transistor or include a transistor.

Preferably, the switching device 1 includes at least one control device 9 for controlling the transitions from one operating state to another operating state. With such control device 9, the switching process can be actively performed and monitored. For example, it can be monitored that the full grid voltage is already present at the second fault current circuit breaker 23, before the first fault current circuit breaker 22 is switched off, i.e. having its input disconnected from the power grid.

The control device 9 is preferably constructed as or includes a programmable logic circuit and/or a microprocessor. Additionally, the switching device 1 may preferably include a power supply, which is not illustrated in the figures, for supplying electrical energy to the control device 9.

According to the illustrated preferred embodiments of a switching device according to the invention, which all include a control device 9, the mechanical or electronic switch 5, 7 may be controlled by the control device 9 and operationally connected with the control device 9. For example, the control device may act on the switch lock, at least indirectly, by way of an electromechanical actuator; or the switch 5, 7 may be implemented as an electronic switch 7 controlling the gate terminal of the illustrated triac. Alternatively, the mechanical switch 5 may be part of a relay arranged in the switching device and controlled by the control device.

According to another illustrated preferred embodiment, the switching device 1 may include at least one voltage measuring device for measuring a voltage on the first switching device output 3 and/or the second switching device output 4. In this way, it can be ensured that the full grid voltage is present at the second fault current circuit breaker 23 before the first fault current circuit breaker 22 is switched off. In this context, the voltage measuring device is preferably constructed as part of the control device 9, and the control device 9 is electrically connected with the first switching device output 3 and/or the second switching device output 4.

Preferably, the switching device has at least one actuating element 25 which is operatively connected with the control device 9 (if a control device is provided), wherein—for example, when simple switching devices 1 are used—the actuating element 25 may be implemented as a manual actuating element of the switch 5 embodied as a mechanical switch 5. Preferably, and as illustrated, the actuating element 25 may be connected with and acting upon the control device 9.

In addition, according to a preferred embodiment of a switching device 1 according to the invention, the switching device 1 may include at least one, in particular optical, signaling means 11 which is controlled in particular by the control device 9. In this way, the operating state of the switching device 1 and/or of the fault current circuit breakers 22, 23 connected with the switching device 1 can be indicated. In this way, a command for unblocking or operating the testing device of one of the two fault current circuit breakers 22, 23 can be communicated to a user. In the illustrated embodiment, the switching device 1 includes two signaling means 11 implemented as LEDs. It should be mentioned that the electrical connections between the control device 9 and the signaling means are not shown in FIGS. 1 to 3.

FIG. 1 shows a first preferred embodiment composed of a switching device 1 according to the invention, a first and a second fault current circuit breaker 22, 23. An unillustrated power grid is connected to the first electrical switching device input 2. An input of the first fault current circuit breaker 22 is electrically connected with the first switching device output 3, and an input of the second fault current circuit breaker 23 is connected with the second switching device output 4.

The switching device 1 has a mechanical switch which is controlled by the control device 5.

According to FIG. 1, the first and the second fault current circuit breakers 22, 23 are constructed as grid-voltage-independent fault current circuit breakers, with each including a sum current converter 32, a permanent magnet trigger 31, and a trigger circuit 19 and a switch lock 26 controlling a switch shaft on which break contacts 20 are arranged. FIGS. 1 to 3 do not show the details of the trigger circuit 19 and hence also not the details of the components or assemblies of this trigger circuit 19. Furthermore, the two fault current circuit breakers 22, 23 each have a test circuit 30 with a test button 27 and a test resistor 28. When the context of the test button 27 are closed, the test circuit connects the two conductors of the grid to be protected, which is routed through the fault current circuit breaker 22, 23, bypassing the sum current converter 32, and thereby stimulating a fault current. Other embodiments different from the illustrated embodiments may also be contemplated.

The two fault current circuit breakers 22, 23 illustrated in FIG. 1 are preferably equipped with a delayed fault current trigger. In the event of a fault current, such fault current circuit breakers 22, 23 are not immediately triggered, but are triggered only when the fault current is still present after a predetermined time. Such fault current circuit breakers 22, 23 are also referred to as G-type or S-type.

In an arrangement according to FIG. 1, uninterrupted switching of the load current from the first to the second fault current circuit breaker 22, 23 is possible without causing triggering, as long as the switching process takes place in a shorter time duration than the planned duration of the trigger delay of the two fault current circuit breakers 22, 23. Any asymmetric potentials occurring during the switching process are not misinterpreted as a fault current, because they occur only during a very brief time during which fault current triggering does not occur.

FIGS. 2 and 3 show additional embodiments of arrangements according to the invention.

The basic structure of an arrangement according to FIG. 2 is mostly identical to a structure according to FIG. 1, with the arrangement of FIG. 2 having additional assemblies.

The two fault current circuit breakers 22, 23 according to FIG. 2 are—although not directly evident from FIG. 2—constructed without a trigger delay or delay-free, and therefore trigger as quickly as possible when a fault current is detected. To allow an uninterrupted switchover with such fault current circuit breakers 22, 23, the switching device 1 has preferably a first control output 10 for affecting the trigger characteristic of a fault current circuit breaker 22, 23 in a predetermined manner.

The trigger current circuit 19 of the first and the second fault current circuit breaker 22, 23 according to FIG. 2 has furthermore a first circuit arrangement 21, for prolonging a trigger time of the trigger current circuit 19 by a predetermined time.

The first switching arrangement 21 may be configured differently, depending on the design of the trigger circuit. In the present example, the first switching arrangement 21 may be configured for short-circuiting the connection between a secondary winding of the sum current converter 32 and the permanent magnet trigger 31. However, other actuating mechanisms and circuit arrangements may also be contemplated.

According to the illustrated embodiment of a fault current circuit breaker 22, 23, the fault current circuit breaker 22, 23 has at least one first control input 24 for controlling the first switching arrangement 21.

Depending on the type of control of the first switching arrangement 21, a control may be separate from the switching device 1 according to the invention, wherein the switching device 1 preferably has at least one first control output 10 for affecting the trigger characteristic of a fault current circuit breaker 22, 23, which is preferably electrically connected with the control device 9, in a predetermined manner.

Figure 6:
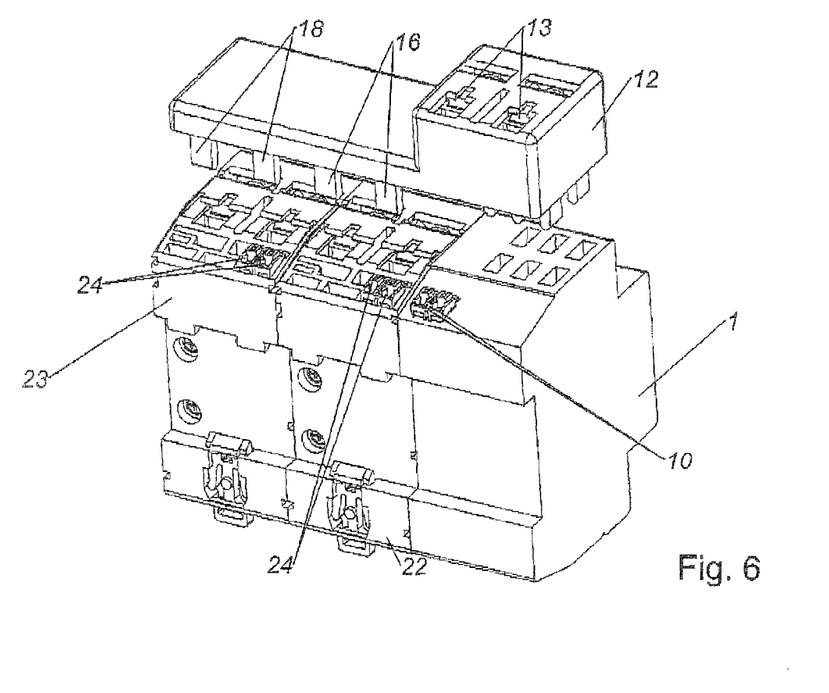
FIG. 6 a second axonometric view of a second structure of an arrangement of a switching device according to the invention, two fault current circuit breakers, and a coupling device.

As illustrated in FIG. 2, the switching device 1 has a first control output 10 and a second control output, wherein the first control output 10 is electrically connected with the first control input 24 of the first fault current circuit breaker 22, and the second control output is connected with the first control input 24 of the second fault current circuit breaker 23. FIG. 6 shows a structural embodiment of such arrangement in an exploded view.

Alternatively, one of the fault current circuit breakers 22, 23 may be constructed as fault current circuit breaker with delayed fault current triggering, while the other fault current circuit breaker 23, 22 may be constructed as fault current circuit breaker 22, 23 according to the invention without a delay.

FIG. 3 shows a third preferred embodiment of an arrangement of a switching device 1 according to the invention and two fault current circuit breakers 22, 23, wherein the two fault current circuit breakers 22, 23 are constructed as fault current circuit breakers with delayed fault current triggering, and wherein the switch of the switching device 1 is implemented as an electronic switch 7 including four triacs, which are each controlled by the control device 9.

Preferably, the switching device 1, like the fault current circuit breakers 22, 23, has a housing made of an insulating material.

The two fault current circuit breakers 22, 23 and the switching device may be electrically connected, for example, with wire jumpers. Because this is complicated and error-prone, the respective components may be more particularly connected by a coupling device 12 for electrical switching devices. Such coupling devices 12 for electrical switching devices 1 are illustrated, for example in FIGS. 4 to 6, which illustrate preferred embodiments of arrangements according to the invention.

A preferred coupling device 12 for electrical switching devices has at least one first input 13 and at least one first output 14, wherein the first input 13 is electrically connected with the first output 14, wherein the coupling device 12 has at least one second input 15 and at least one second output 16, wherein the second input 15 is electrically connected with the second output 16, wherein the coupling device 12 has at least one third input 17 and at least one third output 18, wherein the third input 17 is electrically connected with the third output 18.

Preferably, the at least one first input 13 is constructed to include at least one screw terminal, and/or the at least one second and/or third input 15, 17 and/or the at least one first and/or second and/or third output 14, 16, 18 are constructed as plug contacts.

Figure 5:
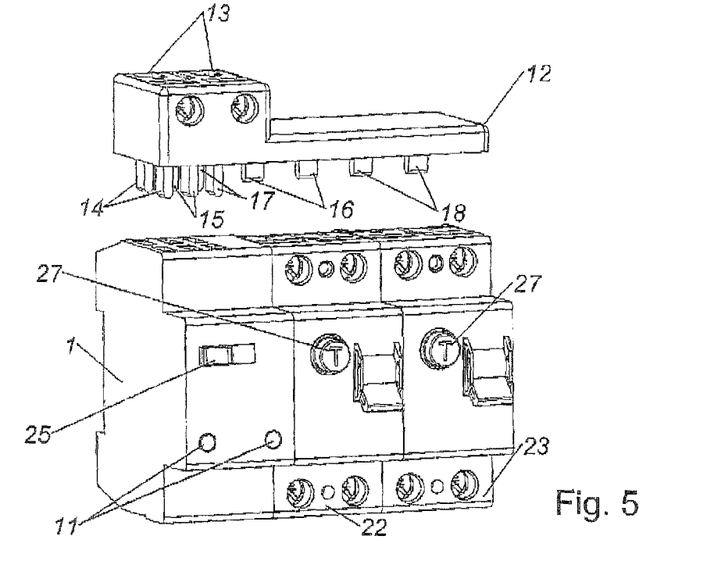
FIG. 5 a first axonometric view of a second structure of an arrangement of a switching device according to the invention, two fault current circuit breakers, and a coupling device.

The embodiment of a coupling device 12 according to FIGS. 5 and 6 is implemented in the aforedescribed manner, wherein the respective embodiment further includes the corresponding contacts and connecting lines for connecting the first control outputs of the switching device 1 with the corresponding 24 of the first and second fault current circuit breaker 22, 23.

Figure 4:
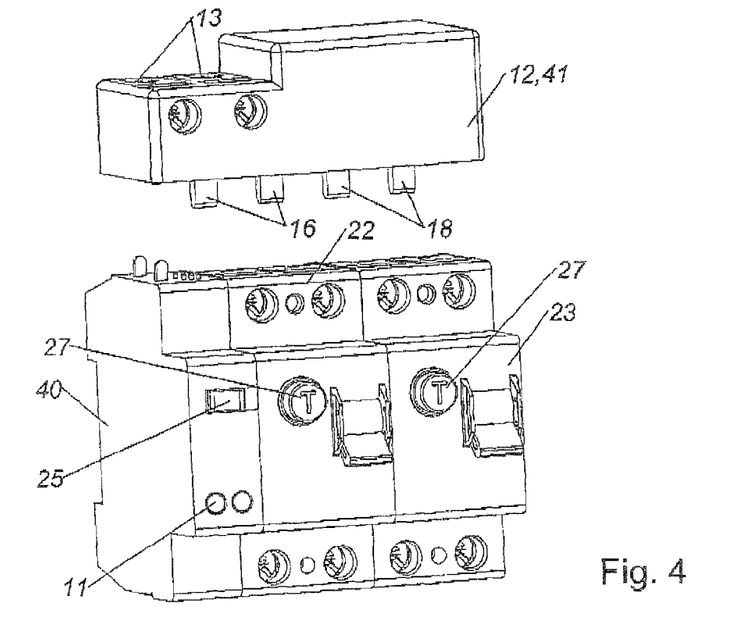
FIG. 4 an axonometric view of a first structure of an arrangement of a switching device according to the invention, two fault current circuit breakers, and a coupling device.

The arrangement according to FIG. 4 has a structure which is different from the other structural embodiments of the invention. This arrangement does not include a switching device 1, but only a control device 40. Preferably, such control device 40 is constructed according to the preferred embodiments of a switching device 1 according to the invention, wherein the control device 40 itself does not include a switch, but rather only the electrical interfaces required for controlling an external switch.

The arrangement according to FIG. 4 has furthermore a specially designed coupling/switching device 41 which includes a switch. This coupling/switching device 41 includes the corresponding feed lines for the wiring of the electrical power grid, as well as corresponding outputs for controlling the first and/or second fault current circuit breakers 22, 23. The coupling/switching device 41 also includes a switch which is formed according to the preceding description of switches in a switching device 1 according to the invention and which therefore allows an uninterrupted switchover of the load current from one of the two fault current circuit breakers to the other. In addition, the coupling/switching device 41 includes an interface for receiving switching commands from the control device 40.

The present invention furthermore relates to a method for uninterrupted functional testing of a first fault current circuit breaker 22, wherein a load current flows through the first fault current circuit breaker 22, wherein the input side of a second fault current circuit breaker 23 is connected in parallel with the first fault current circuit breaker 22 to the load current, wherein the load current is uninterruptedly switched from the first fault current circuit breaker 22 to the second fault current breaker 23, wherein a functional test of the first fault current circuit breaker 22 is performed, wherein after the first fault current circuit breaker 22 has been successfully functionally tested, the first fault current circuit breaker 22 is switched on, wherein the input side of the first fault current circuit breaker 22 is connected in parallel with the second fault current circuit breaker 23 to the load current, wherein the load current is switched without interruption from the second fault current circuit breaker 23 to the first fault current circuit breaker 22, and wherein the second fault current circuit breaker 23 is switched off.

This method can be used to test the functionality of a fault current circuit breaker 22, 23 without interruption.

The process flow of a particular embodiment of a method according to the invention will now be described, wherein not all the described preferred process steps must be necessarily executed.

After the load current preferably flows through the coupling device 12, the load current flows through the switching device 1, as well as through the first fault current circuit breaker 22 to a consumer. The second fault current circuit breaker 23 is electrically connected in parallel to the first fault current circuit breaker 22, wherein the second fault current circuit breaker 23 is switched on at this time, with the disconnect contacts 20 closed, but is on the input side not connected to the power grid. Accordingly, no current flows at this time via the second fault current circuit breaker 23 to the consumer.

However, the output or load side of the second fault current circuit breaker 23 is connected with the corresponding terminals of the first fault current circuit breaker 22, causing its testing device to be essentially at the same electrical potential as the corresponding devices of the first fault current circuit breaker 22. According to a preferred embodiment of the method of the invention, a corresponding functional test of the second fault current circuit breaker 23 is performed, preferably by operating the test button 27 of the second fault current circuit breaker 23, before the functionality of the fault current triggering of the first fault current circuit breaker 22 is further tested.

For uninterrupted testing, the input side of the second fault current circuit breaker 23 is connected by the switching device 1 in parallel with the first fault current circuit breaker 22 to the power supply grid. In this situation, the load current flows to a load via both the first and the second fault current circuit breakers 22, 23, if such load is operated at that time.

Preferably, before the uninterrupted switchover from the first fault current circuit breaker 22 to the second fault current circuit breaker 23, it is checked if the second fault current circuit breaker 23 is switched on. In this way, the first fault current circuit breaker 23 can be prevented from switching off, as long as the second fault current circuit breaker 23 is not yet ready to carry the load current.

Optionally, the trigger circuits 19 of the first and the second fault current circuit breaker 22, 23 may be inhibited, or a first trigger time of the first fault current circuit breaker 22 and a second trigger time of the second fault current circuit breaker 23 may be extended for a predetermined time during the uninterrupted switchover from the first fault current circuit breaker 22 to the second fault current circuit breaker 23. Completely inhibiting triggering may also represent an extension of the trigger time.

Thereafter, the load current is switched without interruption from the first to the second fault current circuit breaker and the first fault current circuit breaker 22 is then disconnected from the load current, wherein this switchover process is preferably performed with the switching device according to the invention. The first fault current circuit breaker 22 is still connected on the load side with the second fault current circuit breaker 23.

If the trigger circuits of the first and the second fault current circuit breakers 22, 23 were inhibited, this inhibit is canceled.

Preferably, a first signal, in particular an optical signal, is outputted after the uninterrupted switchover from the first fault current circuit breaker 22 to the second fault current circuit breaker 23. This signal informs the user that the first fault current circuit breaker 22 can be checked to test the functionality of the fault current triggering. Preferably, other operating states or instructions, for example relating to the actuation of the testing device of a particular fault current circuit breaker, may be displayed to the user.

The functionality of the fault current triggering of the first fault current circuit breaker 22 can then be tested. To this end, the test button 27 of the first fault current circuit breaker 22 is actuated, which can be done manually, or—if implemented as an electrical circuit—with a remote signal control of the test button 27, for example by the switching device 1. Because of the first fault current circuit breaker 22 is connected on the load side with a second fault current circuit breaker 23, a conventional test circuit 30 continues to function.

After successful testing the functionality of the fault current triggering of the first fault current circuit breaker 22, i.e., if the first fault current circuit breaker 22 was triggered successfully, a switchover occurs from the second fault current circuit breaker 23 to the first fault current circuit breaker 22. The first fault current circuit breaker 22 is then again switched on, at a first step. The input side of the first fault current circuit breaker 22 is then once more connected in parallel with the second fault current circuit breaker 23 to the load current, and the input side of the second fault current circuit breaker 23 is then disconnected from the load current.

In this state, testing of the fault current triggering of the second fault current circuit breaker 23 is planned, unless not previously performed, for example by actuating the corresponding test current circuit 30 of the second fault current circuit breaker 23.

When testing or using fault current circuit breakers 22, 23 having delayed fault current triggering, only the aforedescribed method steps are preferably implemented.

When testing or using fault current circuit breakers 22, 23 which do not have a corresponding delay of the fault current triggering, then the trigger time of the corresponding fault current circuit breakers 22, 23 is preferably extended and/or the triggering is completely inhibited during switchover from one fault current circuit breaker 22, 23 to the other fault current circuit breaker 23, 22—as already described above.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A circuit arrangement comprising:
   a first grid-voltage-independent fault current circuit breaker, a second grid-voltage-independent fault current circuit breaker, each of the first and second fault current circuit breaker comprising disconnect contacts, a sum current converter, and a trigger current circuit at least indirectly operatively connected with the disconnect contacts for disconnecting the disconnect contacts, with the trigger current circuit comprising a first switching arrangement for extending a trigger time of the trigger current circuit by a predetermined time, and at least one first control input for controlling the first switching arrangement, a switching device, a coupling unit electrically connecting the first fault current circuit breaker and the second fault current circuit breaker with one another in parallel with the switching device, wherein the switching device comprises at least one first electrical switching device input, at least one first electrical switching device output, and at least one second electrical switching device output, at least one first control output for affecting a trigger characteristic of at least one of the first and second fault current circuit breaker connected to the switching device, wherein in a first operating state of the switching device the first switching device input is electrically connected with the first switching device output, and wherein in a second operating state of the switching device the first switching device input is electrically connected with the second switching device output, wherein the switching device is constructed for uninterrupted transition from the first operating state to the second operating state or from the second operating state to the first operating state.

2. The switching device of claim 1, further comprising at least one control device for controlling the transition from the first operating state to the second operating state or from the second operating state to the first operating state.

3. The switching device of claim 1, further comprising at least one voltage measuring device for measuring a voltage on the first switching device output or the second switching device output, or on both.

4. The switching device of claim 2, further comprising at least one signaling means which is controlled by the control device.

5. The switching device of claim 4, wherein the at least one signaling means is an optical signaling means.

6. A method for uninterrupted functional testing of first and second grid-voltage-independent fault current circuit breakers, comprising the steps of:

routing a load current through the first fault current circuit breaker, connecting an input of a second fault current circuit breaker to the load current in parallel with the first fault current circuit breaker, switching the load current over without interruption from the first fault current circuit breaker to the second fault current circuit breaker, performing a functional test of the first fault current circuit breaker, after a successful functional test of the first fault current circuit breaker, switching the first fault current circuit breaker on, connecting an input of the first fault current circuit breaker to the load current in parallel with the second fault current circuit breaker, switching the load current over without interruption from the second fault current circuit breaker to the first fault current circuit breaker, and extending a first trigger time of the first fault current circuit breaker and a second trigger time of the second fault current circuit breaker for a predetermined time during the uninterrupted switchover from the first fault current circuit breaker to the second fault current circuit breaker or during the uninterrupted switchover from the second for current circuit breaker to the first fault current circuit breaker.

7. The method of claim 6, and further switching off the second fault current circuit breaker.

8. The method of claim 6, and further checking whether the second fault current circuit breaker is switched on before the uninterrupted switchover from the first fault current circuit breaker to the second fault current circuit breaker occurs.

9. The method of claim 6, and further emitting a signal subsequent to the uninterrupted switchover from the first fault current circuit breaker to the second fault current circuit breaker.

10. The method of claim 6, wherein the signal is an optical signal.

* * * * *

UNITED STATES PATENT AND TRADEMARK OFFICE
CERTIFICATE OF CORRECTION

| | |
|---|---|
| PATENT NO. | : 8,836,339 B2 |
| APPLICATION NO. | : 13/212664 |
| DATED | : September 16, 2014 |
| INVENTOR(S) | : Gerhard Dobusch and Roman Kolm |

It is certified that error appears in the above-identified patent and that said Letters Patent is hereby corrected as shown below:

In the Claims

Column 12, line 31, change "for current circuit breaker" to -- fault current circuit breaker --

Signed and Sealed this
Thirteenth Day of January, 2015

Michelle K. Lee
*Deputy Director of the United States Patent and Trademark Office*